US012707158B2

(12) United States Patent
Jang et al.

(10) Patent No.: US 12,707,158 B2
(45) Date of Patent: Aug. 11, 2026

(54) IMAGE SENSOR, IMAGE SIGNAL PROCESSOR, AND OPERATING METHOD OF IMAGE SIGNAL PROCESSOR

(71) Applicant: Samsung Electronics Co., Ltd., Suwon-si (KR)

(72) Inventors: Chanyoung Jang, Suwon-si (KR); Yonghee Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

(21) Appl. No.: 19/014,549

(22) Filed: Jan. 9, 2025

(65) Prior Publication Data

US 2026/0059204 A1 Feb. 26, 2026

(30) Foreign Application Priority Data

Aug. 23, 2024 (KR) ........................ 10-2024-0113703

(51) Int. Cl.
*H04N 23/88* (2023.01)
*G06T 7/11* (2017.01)
(Continued)

(52) U.S. Cl.
CPC ............... *H04N 23/88* (2023.01); *G06T 7/11* (2017.01); *G06T 7/90* (2017.01); *H04N 9/73* (2013.01);
(Continued)

(58) Field of Classification Search
CPC ...... H04N 23/88; H04N 23/11; H04N 25/134; H04N 9/73; G06T 7/11; G06T 7/90; G06T 2207/10024; G06T 2207/20012
See application file for complete search history.

(56) References Cited

U.S. PATENT DOCUMENTS 6,674,905 B1 * 1/2004 Matsugu .................. G06T 7/11 382/199
9,451,226 B2 9/2016 Jung et al.
(Continued)

FOREIGN PATENT DOCUMENTS

JP 2007-306422 A 11/2007
JP 4777038 B2 9/2011
(Continued)

*Primary Examiner* — Hung H Lam

(74) *Attorney, Agent, or Firm* — Wolf, Greenfield & Sacks, P.C.

(57) ABSTRACT

A method of operating an image signal processor includes storing, by a color shading profile storage circuit, region-specific color shading values extracted from first image data, obtaining, by a region of interest-obtaining circuit, a region of interest, receiving, by a global white balance gain-receiving circuit, a global white balance gain from an application processor, calculating, by a region-specific white balance gain-calculating circuit, region-specific color shading weights, based on a first color shading value of the region of interest and a second color shading value for each region, calculating, by the region-specific white balance gain-calculating circuit, region-specific white balance gains, based on the global white balance gain and the region-specific color shading weights, and correcting, by a white balance-correcting circuit, white balance of second image data, based on the region-specific white balance gains.

20 Claims, 13 Drawing Sheets

(51) Int. Cl.
*G06T 7/90* (2017.01)
*H04N 9/73* (2023.01)

(52) U.S. Cl.
CPC ............... *G06T 2207/10024* (2013.01); *G06T 2207/20012* (2013.01)

(56) References Cited

U.S. PATENT DOCUMENTS

| | | | | |
|---|---|---|---|---|
| 9,800,853 | B2 | 10/2017 | D'Alfonso et al. | |
| 11,381,796 | B2 * | 7/2022 | Hsiao | H04N 23/11 |
| 12,052,516 | B2 * | 7/2024 | Feng | G06V 10/25 |
| 2002/0101516 | A1 * | 8/2002 | Ikeda | H04N 23/88<br>348/655 |
| 2008/0211925 | A1 * | 9/2008 | Misawa | H04N 23/88<br>348/E9.051 |
| 2017/0094241 | A1 * | 3/2017 | Fujiwara | H04N 1/6086 |
| 2024/0223737 | A1 * | 7/2024 | Chen | G06T 7/11 |

FOREIGN PATENT DOCUMENTS

| | | | |
|---|---|---|---|
| JP | 6536000 | B2 | 7/2019 |
| JP | 6968650 | B2 | 11/2021 |
| KR | 10-1639664 | B1 | 7/2016 |

* cited by examiner

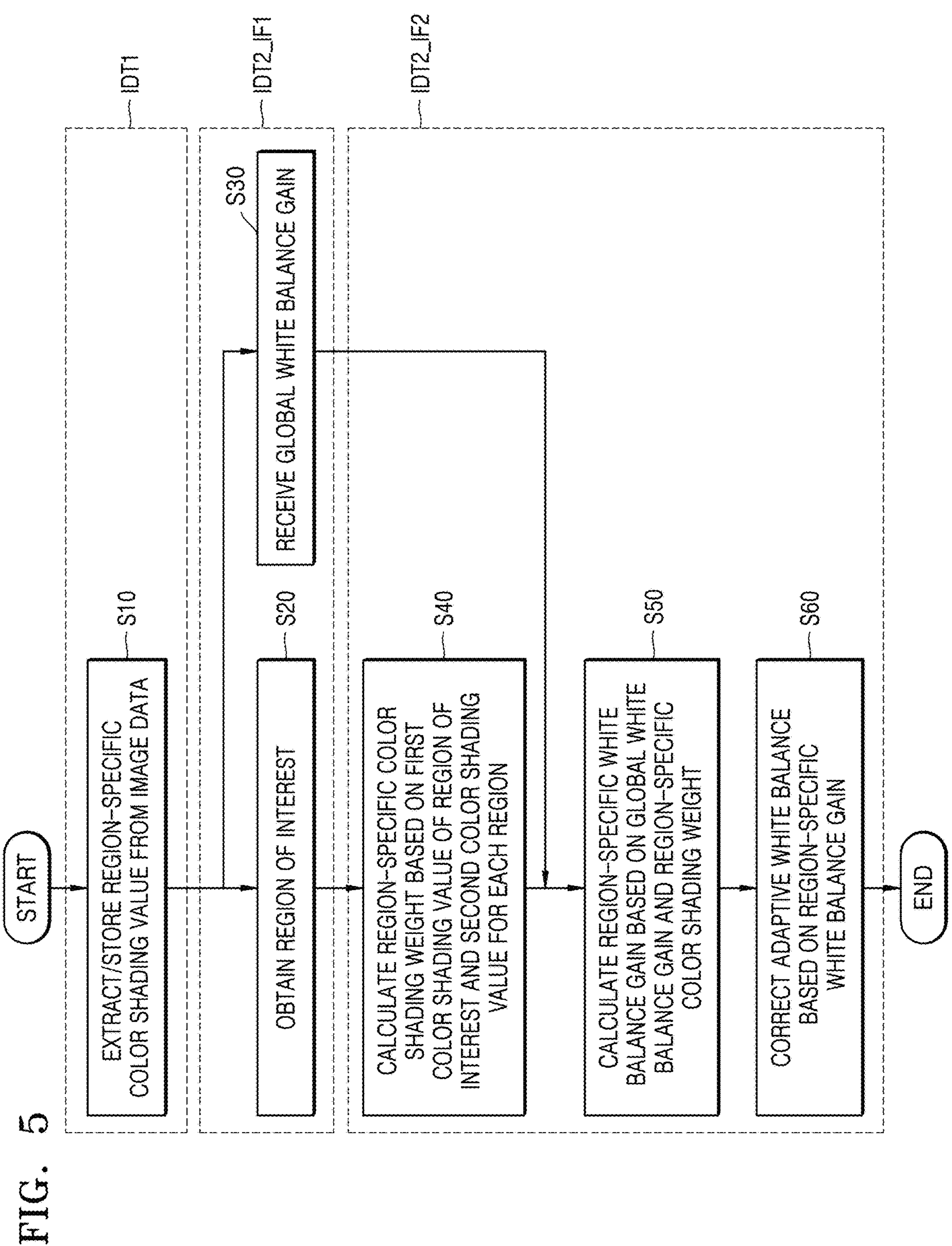
FIG. 5
START
IDT1
S10
EXTRACT/STORE REGION-SPECIFIC COLOR SHADING VALUE FROM IMAGE DATA
IDT2_IF1
S20
OBTAIN REGION OF INTEREST
S30
RECEIVE GLOBAL WHITE BALANCE GAIN
IDT2_IF2
S40
CALCULATE REGION-SPECIFIC COLOR SHADING WEIGHT BASED ON FIRST COLOR SHADING VALUE OF REGION OF INTEREST AND SECOND COLOR SHADING VALUE FOR EACH REGION
S50
CALCULATE REGION-SPECIFIC WHITE BALANCE GAIN BASED ON GLOBAL WHITE BALANCE GAIN AND REGION-SPECIFIC COLOR SHADING WEIGHT
S60
CORRECT ADAPTIVE WHITE BALANCE BASED ON REGION-SPECIFIC WHITE BALANCE GAIN
END

IMAGE SENSOR, IMAGE SIGNAL PROCESSOR, AND OPERATING METHOD OF IMAGE SIGNAL PROCESSOR

CROSS-REFERENCE TO RELATED APPLICATIONS

This present application claims priority to and the benefit under 35 U.S.C. § 119(a)-(d) to Korean Patent Application No. 10-2024-0113703, filed on Aug. 23, 2024, in the Korean Intellectual Property Office, the entire disclosure of which is incorporated herein by reference.

BACKGROUND

Imaging devices may be used not only in general consumer electronic devices, such as digital cameras, cameras for mobile phones, and portable camcorders, but also in cameras mounted on automobiles, security devices, and robots. Such an imaging device may include a pixel array, and each pixel in the pixel array may include a light-sensing element. The light-sensing element may generate an electrical signal depending on the intensity of light absorbed by the light-sensing element.

SUMMARY

The inventive concept provides an image sensor, an image signal processor, and a method of operating the image signal processor that performs adaptive white balance correction for each region of an image when performing image processing.

According to an aspect of the inventive concept, there is provided a method of operating an image signal processor, the method including storing region-specific color shading values extracted from first image data associated with an image, obtaining information identifying a region of interest of the image, receiving a global white balance gain, calculating region-specific color shading weights based on a first color shading value of the region of interest and a second color shading value for each region of the image, calculating region-specific white balance gains based on the global white balance gain and the region-specific color shading weights, and correcting white balance of second image data associated with the image based on the region-specific white balance gains.

According to another aspect of the inventive concept, there is provided an image signal processor including a color shading profile storage circuit configured to store region-specific color shading values extracted from first image data associated with an image, a region of interest-obtaining circuit configured to obtain information identifying a region of interest of the image, a global white balance gain-receiving circuit configured to receive a global white balance gain from an application processor, a region-specific white balance gain-calculating circuit configured to calculate region-specific color shading weights, based on a first color shading value of the region of interest and a second color shading value for each region of the image, and configured to calculate region-specific white balance gains based on the global white balance gain and the region-specific color shading weights, and a white balance-correcting circuit configured to correct white balance of second image data associated with the image based on the region-specific white balance gains.

According to another aspect of the inventive concept, there is provided an image sensor including a memory configured to extract and store region-specific color shading values from first image data generated at a first point in time and an image signal processor configured to obtain a region of interest for second image data generated at a second point in time after the first point in time, receive a global white balance gain from an application processor, extract a first color shading value of the region of interest from the region-specific color shading values stored in the memory, calculate region-specific color shading weights, based on the first color shading value and the region-specific color shading values, calculate region-specific white balance gains, based on the global white balance gain and the region-specific color shading weights, and correct white balance of the image data, based on the region-specific white balance gains.

BRIEF DESCRIPTION OF THE DRAWINGS

Embodiments will be more clearly understood from the following detailed description taken in conjunction with the accompanying drawings in which:

FIG. 5 is a flowchart illustrating a method of operating an image signal processor, according to an embodiment;

DETAILED DESCRIPTION OF THE EMBODIMENTS

Described herein are image processing technique designed to perform white balance correction adaptively, so that a region of an image can be corrected independently of the other regions.

White balance processing refers to the process of adjusting the colors in an image or video to ensure that objects that appear white in reality are rendered as white under varying lighting conditions. This adjustment is often used in image processing because different light sources (e.g., daylight, incandescent, or fluorescent) emit light with varying color temperatures, which can cause an undesired color cast in captured images. Without proper white balance, the image colors will appear unnatural. Accordingly, white balance processing is often performed on pixel signals output from a pixel array to ensure that all colors are balanced. The inventors have recognized and appreciated, however, that white balance processing may be sub-optimal when used in arrays in which a plurality of pixels share a single micro lens, or when used in arrays in which the micro lenses corresponding to different pixels are different from each other in curvature and/or height. In either case, applying the same white balance gain to each region of an image may result in some of the colors being unbalanced.

The techniques developed by the inventors and described herein overcome the limitations described above using adaptive white balance correction for each region of an image. By applying white balance gain adaptively, rather than applying the same gain across multiple pixels, the techniques described herein ensure that all colors properly are balanced.

Hereinafter, embodiments are described in detail with reference to the accompanying drawings.

Figure 1:
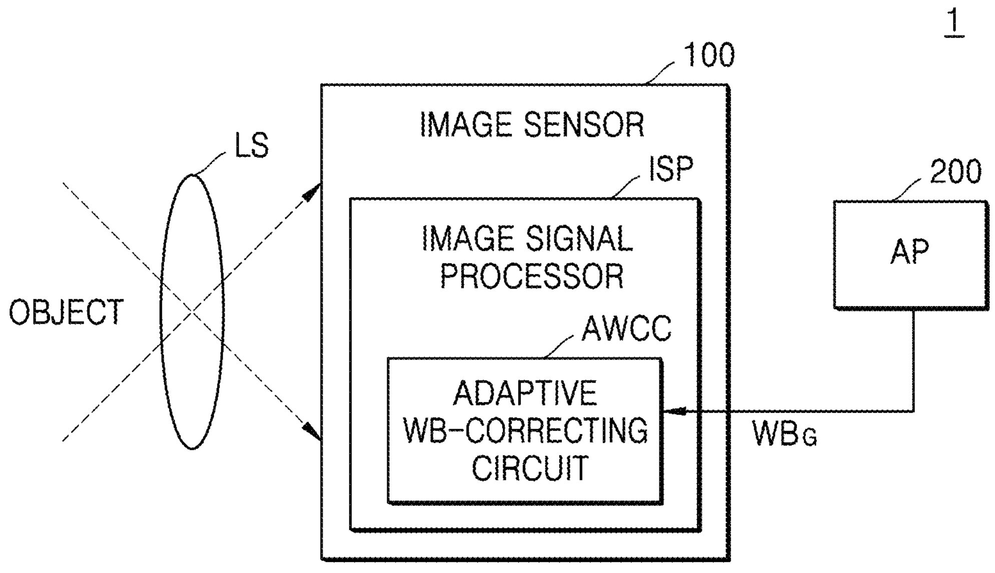
FIG. 1 is a block diagram showing an image processing system according to an embodiment.

FIG. 1 is a block diagram showing an image processing system 1 according to an embodiment.

Referring to FIG. 1, the image processing system 1 may include an image sensor 100 and an application processor (AP) 200. The image processing system 1 may further include other components, such as a display and a user interface. The AP 200 or the image processing system 1 may be provided as a system on chip (SoC).

The image sensor 100 may convert an optical signal reflected from an object through an optical lens LS into an electrical signal and may generate and output image data on the basis of the electrical signal. The image sensor 100 may include a color filter array having a certain pattern and may convert an optical signal into an electrical signal using the color filter array. The color filter array may include at least some of a green filter, a red filter, a blue filter, a white filter, a yellow filter, a cyan filter, and a magenta filter.

An image signal processor ISP of the image sensor 100 may perform image signal processing for image data to reduce noise and improve image quality, such as crosstalk correction, auto dark level compensation, lens shading compensation, bad pixel correction, remosaic, noise removal, gamma correction, white balance correction, auto focus processing, and auto exposure processing. The image signal processor ISP may be provided as a software module executed by a certain processor or as a combination of a dedicated hardware module and a processing unit.

An adaptive white balance (WB)-correcting circuit AWCC of the image signal processor ISP may perform region-specific WB correction based on region-specific WB gains for image data. The adaptive WB-correcting circuit AWCC may calculate region-specific color shading weights from a color shading value of a region of interest (ROI) and region-specific color shading values by using a color shading profile that is pre-stored in a one-time programmable (OTP) device, and may calculate the region-specific WB gains by applying the region-specific color shading weights to a global WB gain received from the AP 200.

Figure 2:
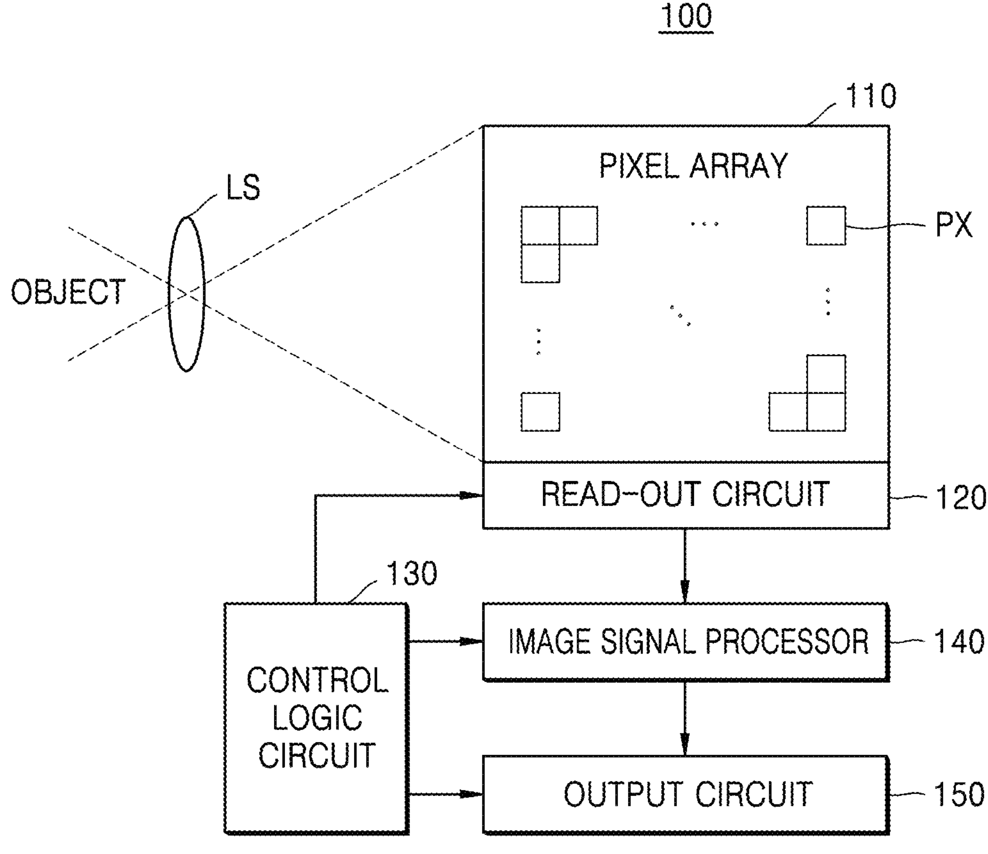
FIG. 2 is a block diagram showing the configuration of an image sensor of FIG. 1.

FIG. 2 is a block diagram showing the configuration of the image sensor 100 of FIG. 1.

The image sensor 100 may convert an object's optical signal incident through an optical lens LS into image data. The image sensor 100 may be mounted on an electronic product having an image or light sensing function. For example, the image sensor 100 may be mounted on electronic equipment, such as a digital still camera, a digital video camera, a smartphone, a wearable device, an internet of things (IoT) device, a tablet personal computer (PC), a personal digital assistant (PDA), a portable multimedia player (PMP), and a navigation device. Also, the image sensor 100 may be mounted on electronic products that are provided, as parts, in vehicles, furniture, manufacturing facilities, doors, and various measurement devices.

Referring to FIG. 2, the image sensor 100 may include a pixel array 110, a read-out circuit 120, a control logic circuit 130, an image signal processor 140, and an output circuit 150.

The pixel array 110 may convert an optical signal into an electrical signal and may include a plurality of pixels PX arranged in two dimensions. Each of the plurality of pixels PX may generate pixel signals according to the intensity of detected light. The pixel PX may be provided as a photoelectric conversion element, such as a charge-coupled device (CCD) and a complementary metal oxide semiconductor (CMOS), and may also be provided as other types of photoelectric conversion elements. In an embodiment, the pixel array 110 may include pixel groups including four pixels PX arranged in two columns and two rows. Each of the pixel groups may include corresponding color filters GF, RF, and BF (see FIG. 3A). The pixels PX in the pixel groups may each correspond to a micro lens ML or may share one micro lens ML. The specific configuration of the pixel array 110 is described below with reference to FIGS. 3A and 3B.

The read-out circuit 120 may receive electrical signals from the pixel array 110 and convert the received electrical signals into image data. The read-out circuit 120 may amplify electrical signals and convert the amplified electrical signals in an analog-to-digital manner. The image data generated from the read-out circuit 120 may include a plurality of pixels that respectively correspond to the plurality of pixels PX of the pixel array 110. Herein, the pixel PX of the pixel array 110 may represent a physical structure that generates a signal according to received light, and the pixel provided in the image data may represent data corresponding to the pixel PX. The read-out circuit 120 may form a sensing core together with the pixel array 110.

The control logic circuit 130 may control all operations of the image sensor 100. In an embodiment, the control logic circuit 130 may control the read-out circuit 120, the image signal processor 140, and the output circuit 150 to generate image data.

The image signal processor 140 may perform image processing on image data that is output from the read-out circuit 120. For example, the image signal processor 140 may perform image processing, such as WB correction, on the image data. In an embodiment, the image signal processor 140 may perform adaptive WB correction for each region including at least one pixel in the image data. In other words, by applying an adaptive WB gain rather than a single WB gain to a plurality of pixels, the image signal processor 140 may perform WB correction so that all colors are balanced. The image signal processor 140 may correspond to the image signal processor ISP of FIG. 1.

The output circuit 150 may communicate with an external processor on the basis of one of a variety of high-speed interface methods. For example, the output circuit 150 may communicate with an external processor on the basis of a mobile industry processor interface (MIPI) method. The output circuit 150 may convert image data output from the image signal processor 140 into image data having a data format according to the set interface method, and may transmit the converted image data to the external processor. The external processor may include a main processor of an electronic device, on which the image sensor 100 is mounted, the AP 200 (FIG. 1), a graphics processor, or the like.

Figure 3A:
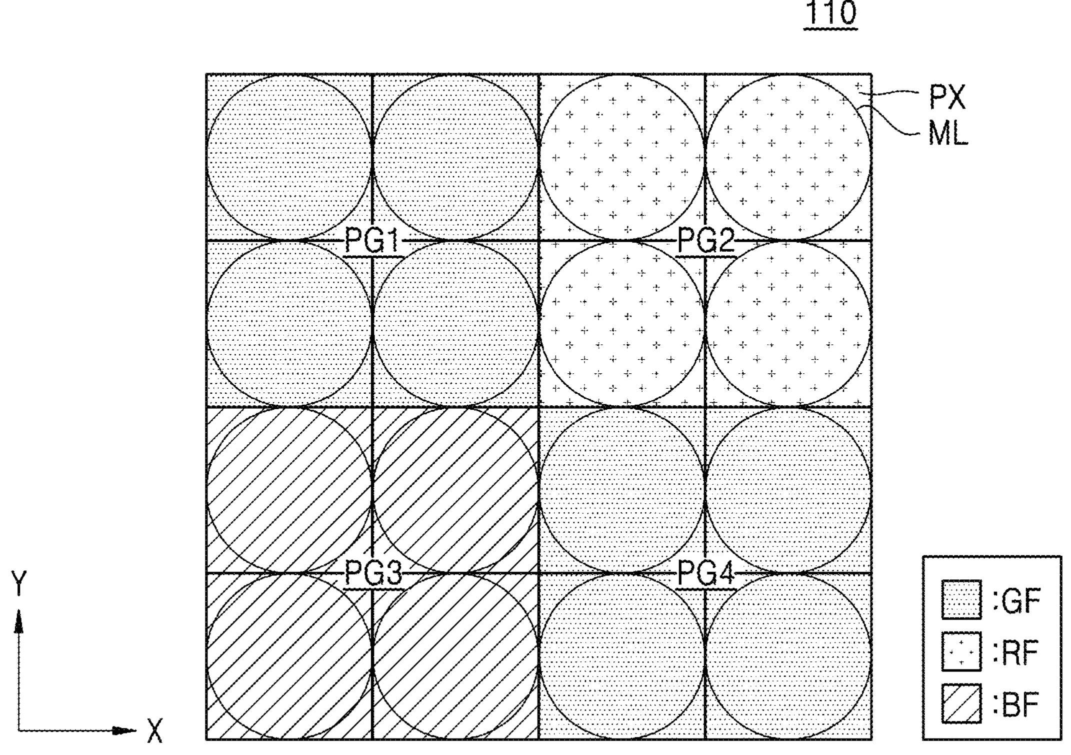
FIGS. 3A to 3C are diagrams illustrating a pixel array of an image sensor according to an embodiment.
Figure 3B:
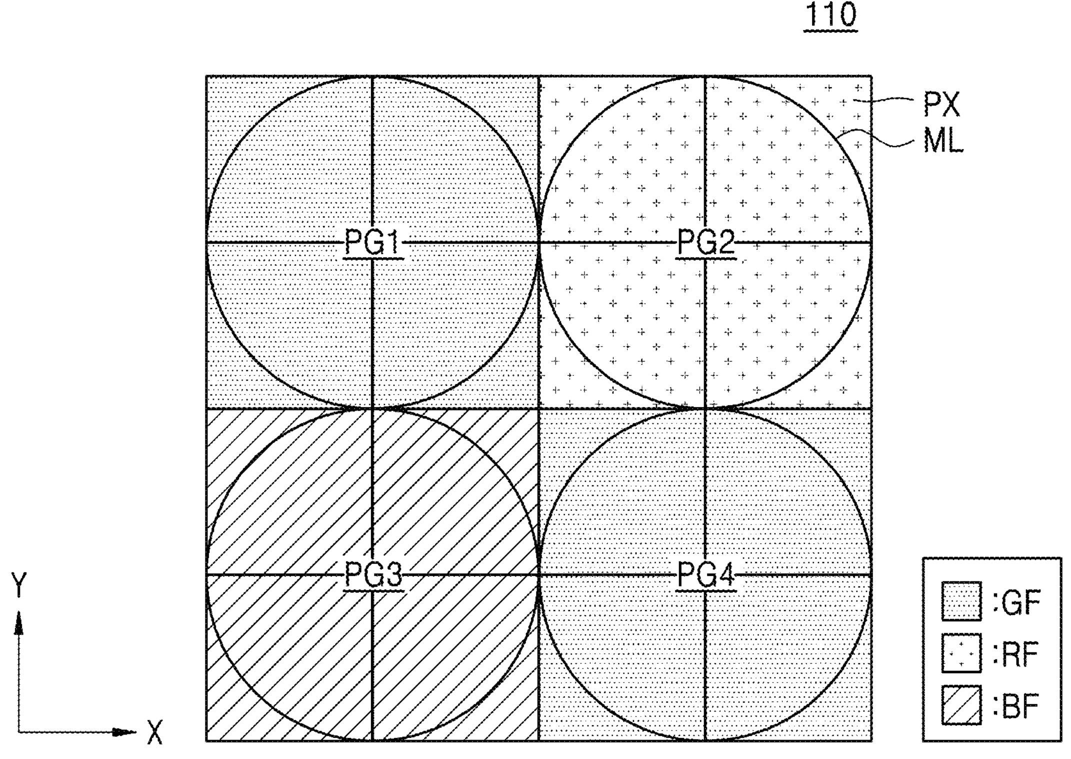
Figure 3C:
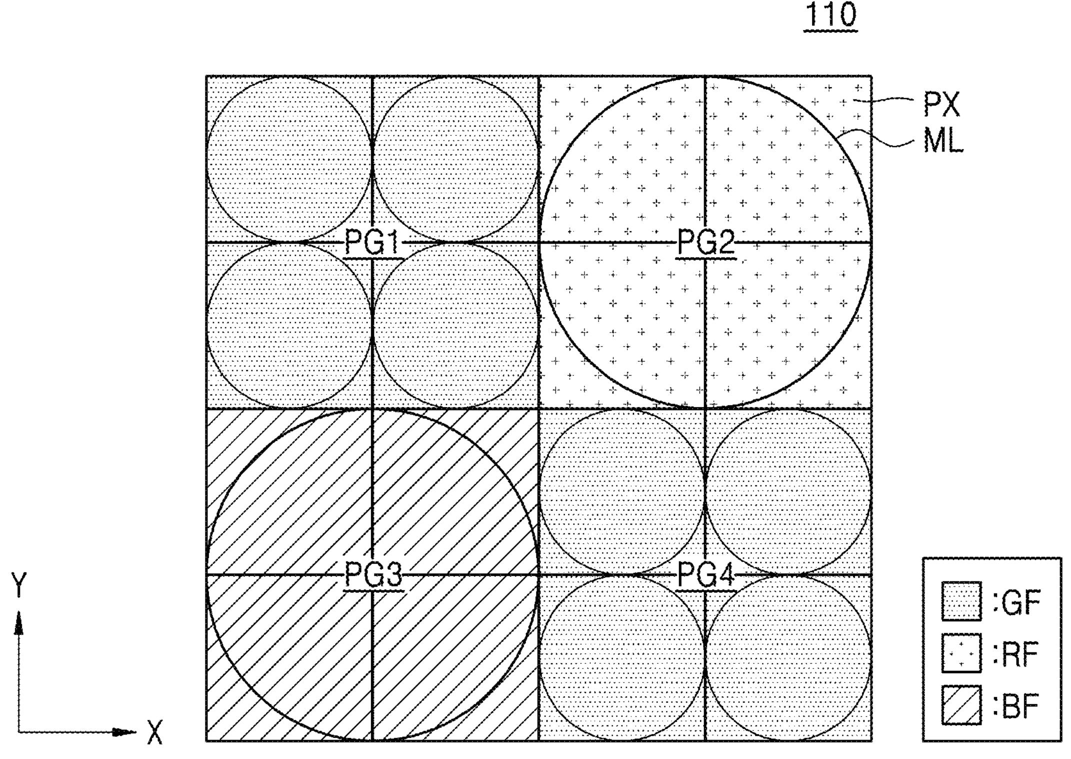

FIGS. 3A to 3C are diagrams illustrating pixel arrays of an image sensor according to an embodiment and also embodiments of part of the pixel array 110 of FIG. 2.

Referring to FIGS. 3A and 3B, the pixel array 110 may include a plurality of pixel groups, for example, first to fourth pixel groups PG1 to PG4. The first to fourth pixel groups PG1 to PG4 may be arranged in two pixel group rows and two pixel group columns (2×2).

The first to fourth pixel groups PG1 to PG4 may each include four pixels PX arranged in two rows and two columns (2×2). One micro lens ML may be placed on one pixel PX of each of the first to fourth pixel groups PG1 to PG4 of FIG. 3A. The first to fourth pixel groups PG1 to PG4 of FIG. 3B may each include one micro lens ML disposed on four pixels PX. In FIG. 3C, the first and fourth pixel groups PG1 and PG4 may each have one micro lens ML disposed on one pixel PX, and the second and third pixel groups PG2 and PG3 may each have one micro lens ML disposed on four pixels PX.

The crosstalk between pixels PX increases due to the reduced size of pixels PX, and the curvature or height of the micro lens ML varies for each pixel PX. Accordingly, non-uniform crosstalk may occur between the pixels PX. By applying region-specific adaptive WB gains to the image data generated by these pixels PX, uniform color reproduction may be secured. The operation of each component of the adaptive WB-correcting circuit AWCC for performing region-specific adaptive WB correction is described below with reference to FIG. 4.

The pixel array 110 may include color filters to sense various colors. Each of the first to fourth pixel groups PG1 to PG4 may include one of a red filter RF, a green filter GF, and a blue filter BF. In an embodiment, the arrangement ratio of red filters RF, green filters GF, and blue filters BF may be 1:2:1 in the pixel array 110.

In an embodiment, the first to fourth pixel groups PG1 to PG4 may include color filters to form a Bayer pattern. For example, the second pixel group PG2 may include the red filter RF, the first and fourth pixel groups PG1 and PG4 may include the green filter GF, and the third pixel group PG3 may include the blue filter BF. However, the inventive concept is not limited thereto, and each of the first to fourth pixel groups PG1 to PG4 may include at least one of a white filter, a yellow filter, a cyan filter, and a magenta filter.

Figure 4:
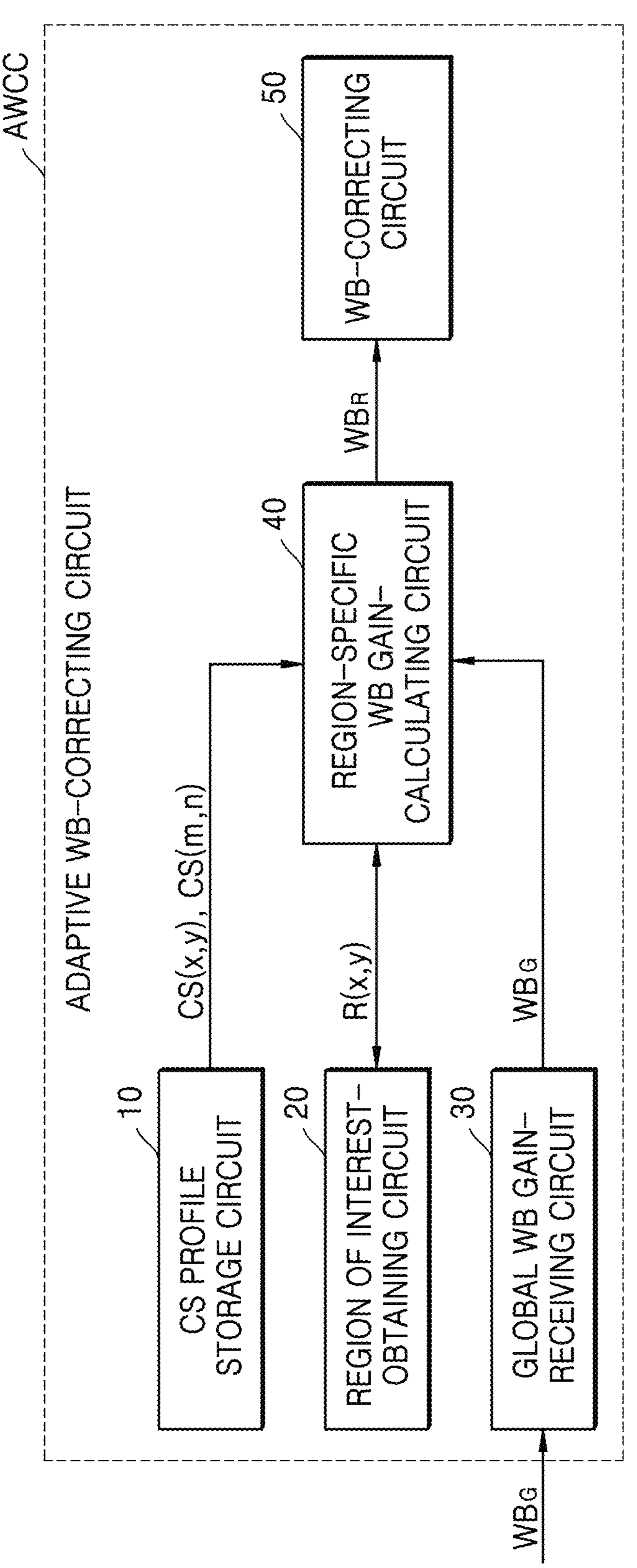
FIG. 4 is a block diagram illustrating an adaptive white balance-correcting circuit of an image signal processor according to an embodiment.

FIG. 4 is a block diagram illustrating an adaptive WB-correcting circuit AWCC of an image signal processor according to an embodiment.

Referring to FIG. 4, an adaptive WB-correcting circuit AWCC may perform WB correction of image data. The image data may correspond to the image data generated by the pixel array 110 described with reference to FIGS. 3A to 3C, and the embodiment is not limited thereto.

The adaptive WB-correcting circuit AWCC may include a color shading (CS) profile storage circuit 10, an ROI-obtaining circuit 20, a global WB gain-receiving circuit 30, a region-specific WB gain-calculating circuit 40, and a WB-correcting circuit 50. The CS profile storage circuit 10, the ROI-obtaining circuit 20, the global WB gain-receiving circuit 30, the region-specific WB gain-calculating circuit 40, and the WB-correcting circuit 50 of the adaptive WB-correcting circuit AWCC may each be provided as a software module executed by a certain processor or as a combination of a dedicated hardware module and a processing unit.

The CS profile storage circuit 10 may store region-specific CS values CS(m,n) extracted from first image data. The region-specific CS values CS(m,n) stored in the CS profile storage circuit 10 may be extracted from the first image data generated at a first point in time.

The CS may represent distortion in which the color of a portion of the image data corresponding to the central region of the pixel is different from the color of a portion of the image data corresponding to the peripheral region of the pixel. Accordingly, the region-specific CS values CS(m,n), for example, the CS values respectively corresponding to pixels, may be the same or different from each other. The CS values may represent the amounts of light of red wavelengths, green wavelengths, and blue wavelengths, and the CS profiles may represent sets of CS values respectively corresponding to pixels. The CS profile storage circuit 10 may extract CS values corresponding to pixels and store these CS values as CS profiles. That is, the CS profile storage circuit 10 may match the position of each pixel to the CS value of each pixel and store the matching results.

The ROI-obtaining circuit 20 may obtain an ROI R(x,y) of image data. The ROI R(x,y) may be obtained from a first image frame of second image data generated at a second point in time after the first point in time.

The ROI R(x,y) may be received by the AP 200 (FIG. 1), represent a region with the minimum sum of absolute difference (SAD) value of the image data, or represent a virtual region with the average value of region-specific CS values. The acquisition of the ROI R(x,y) is described below with reference to FIGS. 7A to 7C. In an embodiment, the ROI R(x,y) may refer to the coordinate values of one pixel. For example, when the coordinate values of a plurality of pixels are received from the AP 200 (FIG. 1), the ROI-obtaining circuit 20 may obtain, as the ROI R(x,y), the coordinate values of one pixel located at the center of the plurality of pixels.

A phase difference may be present in the pixel values of image data obtained by pixels PX that share one micro lens ML, and region-specific SAD values may be calculated for phase difference detection. The ROI R(x,y) may represent the region with the minimum SAD value.

The global WB gain-receiving circuit 30 may receive a global WB gain $WB_G$ from the AP 200 (FIG. 1). The global WB gain $WB_G$ may include a single WB gain. The global WB gain-receiving circuit 30 may receive the global WB gain $WB_G$ while the first image frame of the second image data is being processed.

The region-specific WB gain-calculating circuit 40 may calculate region-specific CS weights on the basis of a first CS value CS(x,y) of the ROI and a second CS value CS(m,n) for each region, and may calculate a region-specific WB gains $WB_R$ on the basis of the global WB gain $WB_G$ and the region-specific CS weights. The region-specific WB gain-calculating circuit 40 may calculate, as the region-specific CS weights, the ratio of the second CS value CS(m,n) for each region to the first CS value CS(x,y) of the ROI, and may calculate the region-specific WB gains $WB_R$ by multiplying the global WB gain $WB_G$ by the region-specific CS weights. The region-specific WB gain-calculating circuit 40 may calculate the region-specific WB gains $WB_R$ for a second image frame, which is the next frame of the first image frame of the second image data.

The WB-correcting circuit 50 may correct the WB of the second image frame of the second image data on the basis of the region-specific WB gains $WB_R$. Accordingly, each region of the image data may be subjected to the adaptive WB gain referred to as the region-specific WB gain $WB_R$, rather than a single gain referred to as the global WB gain $WB_G$.

According to embodiments, non-uniformity in the WB of pixel signals due to the reduced size of pixels PX and diversity of micro lenses ML may be alleviated by the adaptive WB gain.

FIG. 5 is a flowchart illustrating a method of operating an image signal processor, according to an embodiment.

Figure 6:
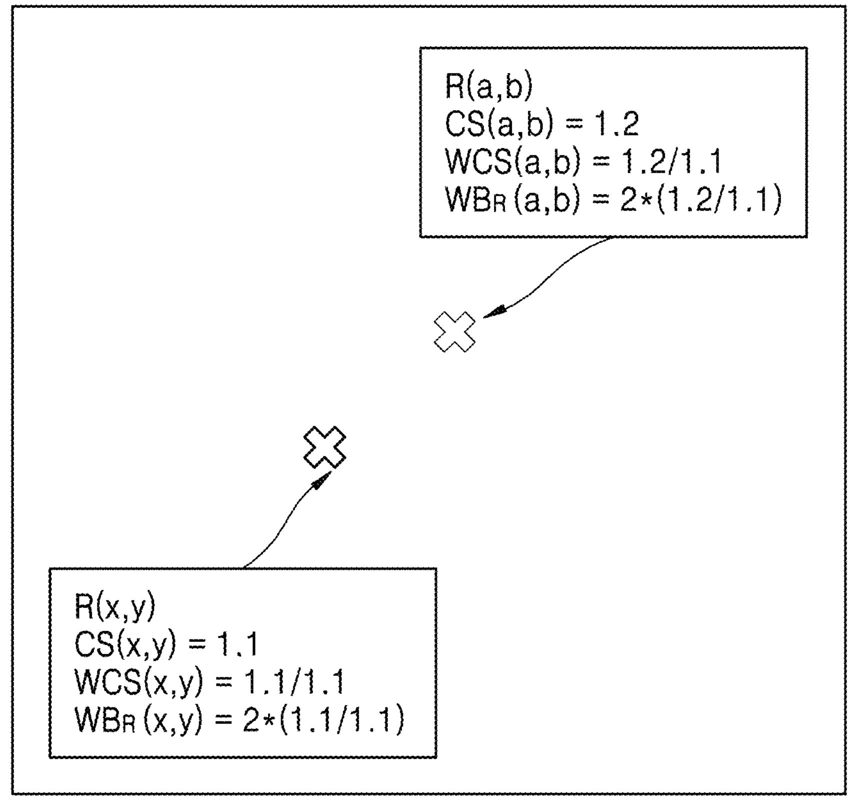
FIG. 6 is a diagram illustrating a method of performing adaptive white balance correction based on a region-specific white balance gains, according to an embodiment.

FIG. 6 is a diagram illustrating a method of performing adaptive WB correction based on region-specific WB gains according to an embodiment.

Figure 7A:
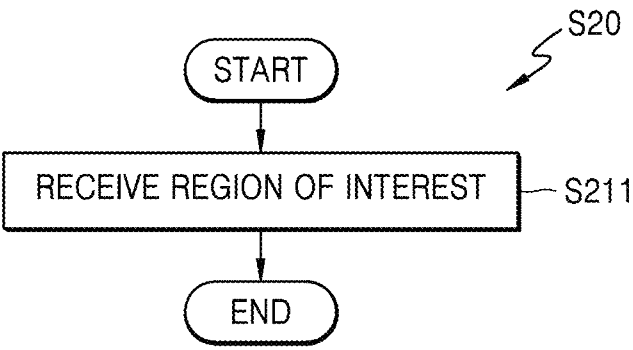
FIGS. 7A to 7C are flowcharts illustrating a method of obtaining a region of interest, according to embodiments.
Figure 7B:
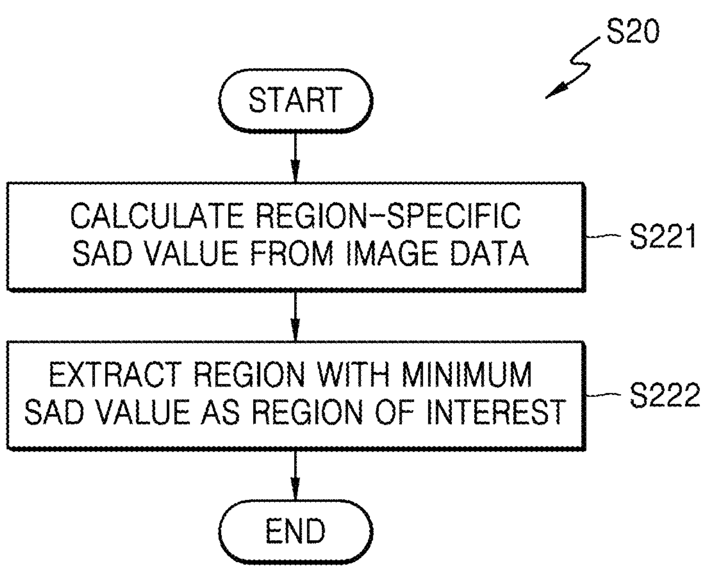
Figure 7C:
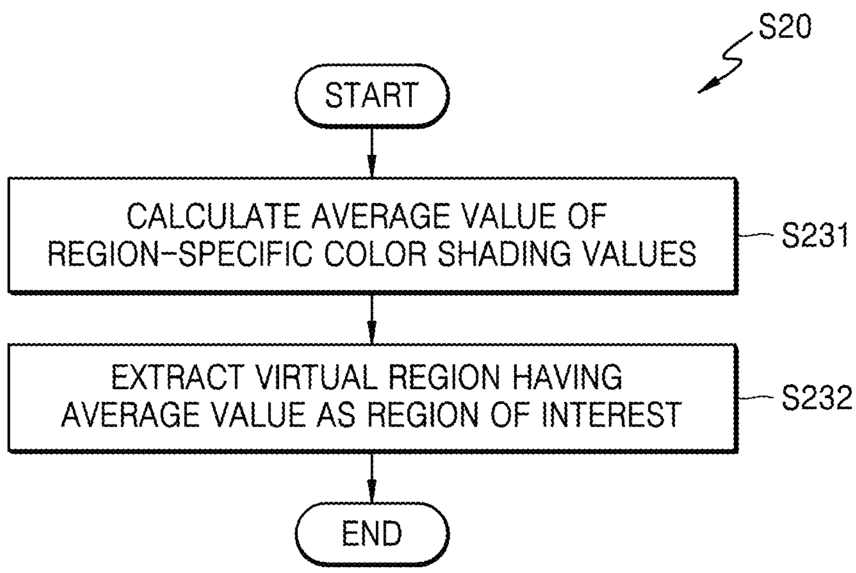

FIGS. 7A to 7C are flowcharts illustrating a method of obtaining an ROI, according to embodiments.

Referring to FIGS. 4, 5, and 6, the CS profile storage circuit 10 stores the region-specific CS values extracted from first image data IDT1 obtained at the first point in time (S10). For example, the CS profile storage circuit 10 may match the coordinate values and CS values of pixels from the first image data IDT1 and store the matching results.

The ROI-obtaining circuit 20 obtains the ROI R(x,y) from a first image frame of the second image data IDT2_IF1 obtained at the second point in time (S20). Herein, x and y may be coordinates that represent row and column positions of a pixel corresponding to the ROI among the pixels provided in the image data.

Referring to FIG. 7A, the ROI-obtaining circuit 20 receives the ROI R(x,y) from the AP 200 (FIG. 1) (S211).

Referring to FIG. 7B, the ROI-obtaining circuit 20 calculates the region-specific SAD values for phase difference detection from image data (S221) and extracts, as the ROI R(x,y), the region with the minimum SAD value among the calculated region-specific SAD values (S222). The region with the minimum SAD value may be an example of the region in which the focus is most clearly detected. In other words, in operation S222, the ROI-obtaining circuit 20 may extract the region, in which the focus is most clearly detected in the image data, as the ROI R(x,y).

Referring to FIG. 7C, the ROI-obtaining circuit 20 calculates the average value of region-specific CS values (S231) and extracts, as the ROI R(x,y), a virtual region having the average value (S232). The region-specific CS values may represent region-specific CS values stored in the CS profile storage circuit 10. That is, the ROI-obtaining circuit 20 may extract, as the ROI R(x,y), the virtual region having the average value that is obtained by dividing the sum of region-specific CS values stored in the CS profile storage circuit 10 by the number of regions.

The methods of obtaining the ROI, described with reference to FIGS. 7A to 7C, may be performed individually, or may or may not be performed depending on priority. For example, in a case in which the ROI R(x,y) may not be received from the AP 200 (FIG. 1), the region with the minimum SAD value among the region-specific SAD values calculated for phase difference detection from the image data may be extracted as the ROI R(x,y). Also, in a case in which the region-specific SAD value for phase difference detection from the image data may not be calculated, the ROI may be obtained by calculating the average value of region-specific CS values.

Referring back to FIGS. 4, 5 and 6, the global WB gain-receiving circuit 30 receives the global WB gain $WB_G$ from the AP 200 (FIG. 1) while the first image frame of the second image data IDT2_IF1 is being processed (S30).

The region-specific WB gain-calculating circuit 40 calculates the region-specific CS weights on the basis of the first CS value CS(x,y) of the ROI and the second CS value CS(m,n) for each region (S40). Herein, m and n may be coordinates that represent row and column positions of a pixel corresponding to each of the pixels provided in the image data. A target region R(a,b) among a plurality of m×n regions is described as an example, and the description of the target region R(a,b) may be applied to all of the m×n regions. Each region may include at least one pixel. x and y in the ROI R(x,y) may be one of m and n, and may be equal to a and b, respectively. For example, when the first CS value CS(x,y) of the ROI is 1.1 and the second CS value CS(a,b) of the target region R(a,b) is 1.2, the region-specific WB gain-calculating circuit 40 may calculate, as the CS weight WCS(a,b) of the target region R(a,b), the value (1.2/1/1) that is obtained by dividing the second CS value CS(a,b) of 1.2 by the first CS value CS(x,y) of 1.1. A CS weight WCS(x,y) of the ROI R(x,y) may be 1.

Next, the region-specific WB gain-calculating circuit 40 calculates the region-specific WB gain, on the basis of the global WB gain $WB_G$ and the region-specific CS weight WCS(a,b) (S50). For example, when the global WB gain $WB_G$ is 2, the WB gain $WB_R$(x,y) of the ROI R(x,y) may be 2 and the WB gain $WB_R$(a,b) of the target region R(a,b) may be 2*(1.2/1.1).

In the region-specific WB gain-calculating circuit 40, the operation of calculating the region-specific CS weight and the operation of calculating the region-specific WB gain may be performed on a second image frame of the second image data IDT2_IF2.

Next, the WB-correcting circuit 50 corrects, on the basis of the region-specific WB gain $WB_R$ (S60), the WB of the second image frame of the second image data IDT2_IF2 obtained by the image sensor 100. For example, the WB-correcting circuit 50 may apply the WB gain $WB_R$(x,y) of 2 to the ROI R(x,y) and apply the WB gain $WB_R$(a,b) of 2*(1.2/1.1) to the target region R(a,b). Therefore, according to embodiments, the adaptive WB correction may be performed on a region on the basis of the CS profile, and thus, the effects of crosstalk between the pixels PX may be handled more effectively.

Figure 8:
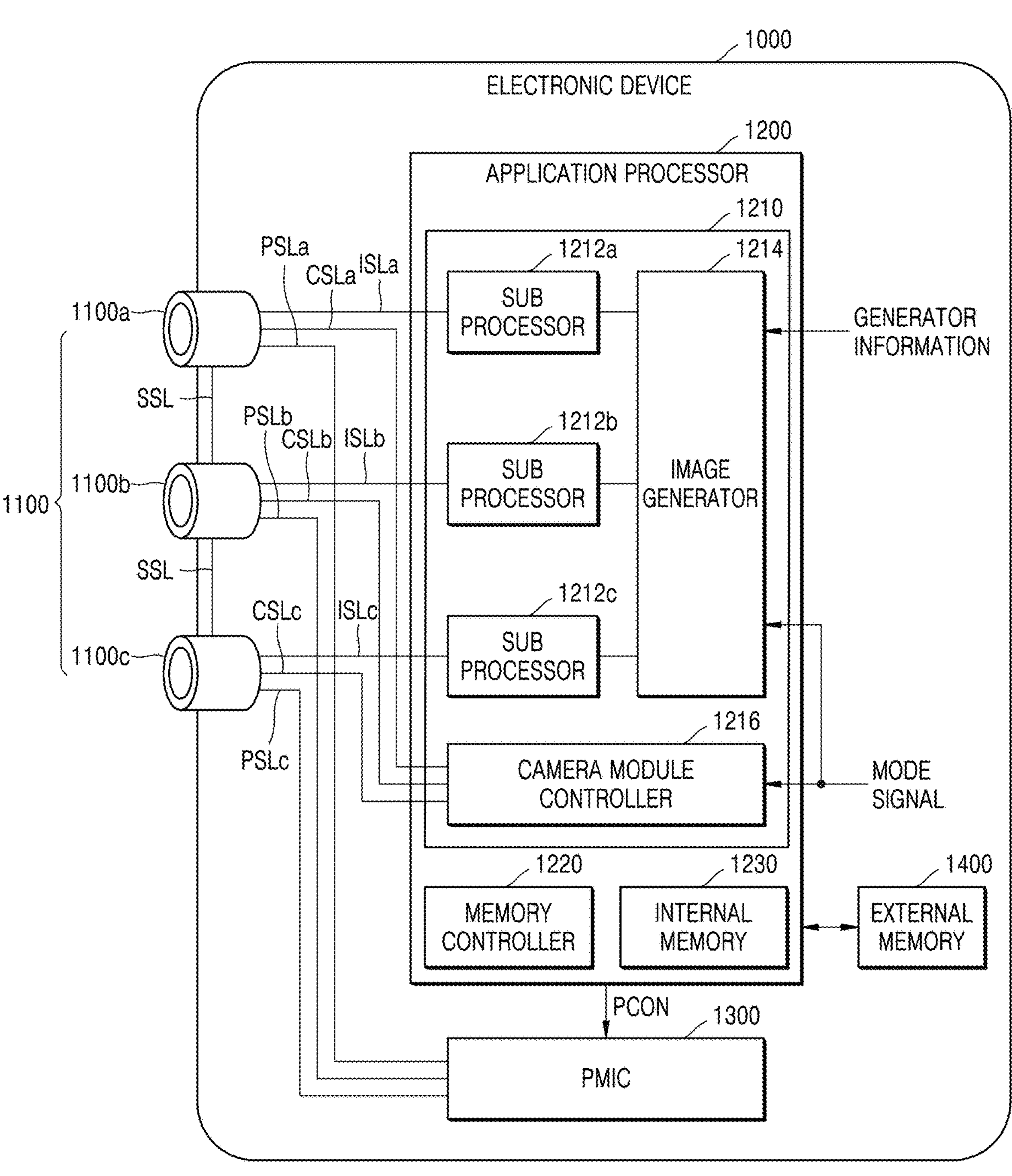
FIG. 8 is a block diagram of an electronic device including a multi-camera module.
Figure 9:
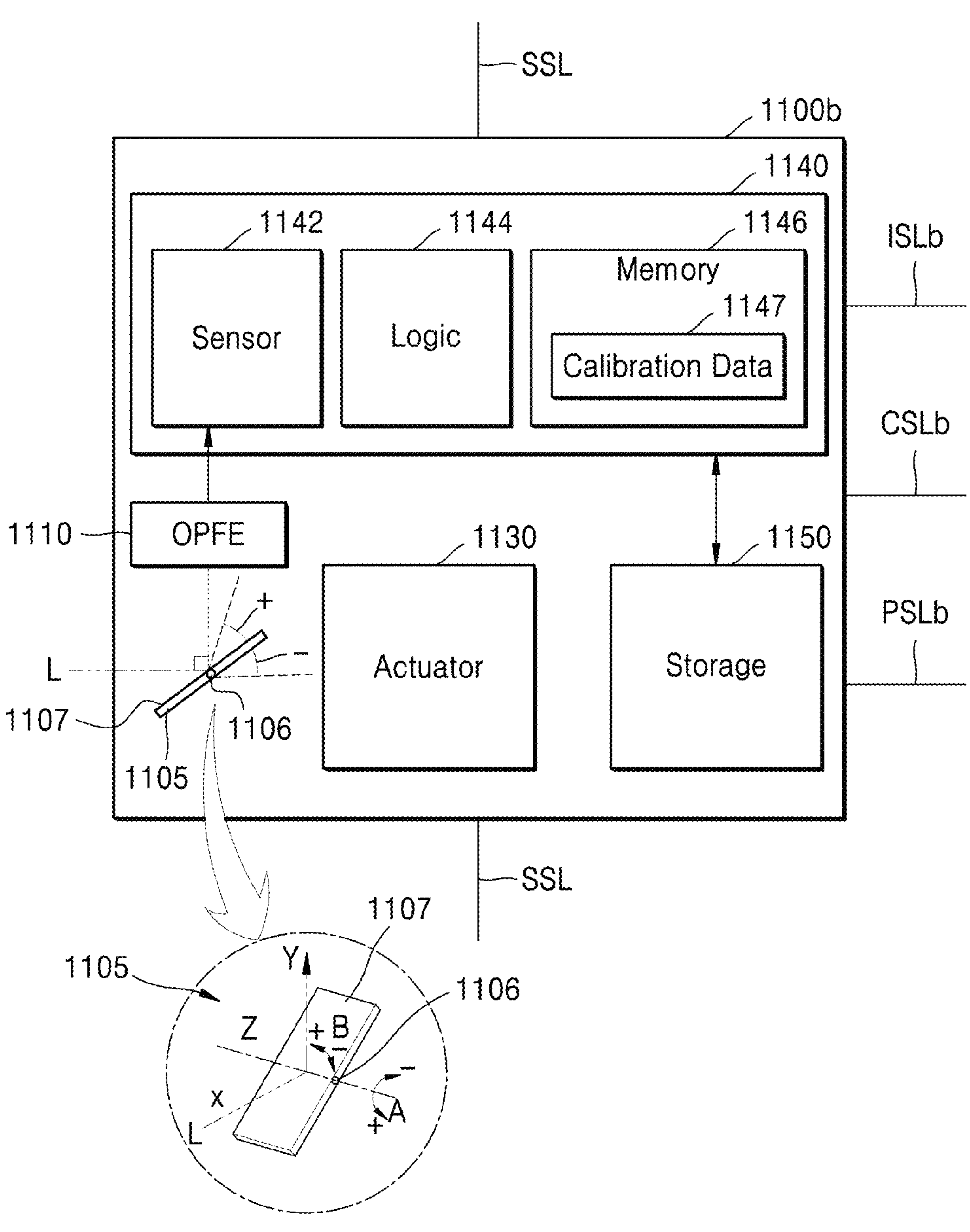
FIG. 9 is a detailed block diagram of the camera module of FIG. 8.

FIG. 8 is a block diagram of an electronic device 1000 including a multi-camera module. FIG. 9 is a detailed block diagram of a camera module 1100*b* of FIG. 8. Although the detailed configuration of the camera module 1100*b* is described with reference to FIG. 9, the following description may equally apply to other camera modules 1100*a* and 1100*c* according to embodiments.

Referring to FIG. 8, the electronic device 1000 may include a camera module group 1100, an AP 1200, a power management integrated circuit (PMIC) 1300, and external memory 1400. The camera module group 1100 may include the plurality of camera modules 1100*a*, 1100*b*, and 1100*c*. Although the diagram illustrates an embodiment in which three camera modules 1100*a*, 1100*b*, and 1100*c* are arranged, embodiments are not limited thereto. In an embodiment, the AP 1200 may correspond to the AP 200 described with reference to FIG. 1. The AP 1200 may generate an ROI and a global WB gain and transmit the ROI and the global WB gain to each of the plurality of camera modules 1100*a*, 1100*b*, and 1100*c*.

Referring to FIGS. 8 and 9, the camera module 1100*b* may include a prism 1105, an optical path folding element 1110 (hereinafter, referred to as an "OPFE 1110"), an actuator 1130, an image sensing device 1140, and a storage 1150.

The prism 1105 includes a reflective surface 1107 of a light-reflecting material and may change a path of external incident light L. The OPFE 1110 may include, for example, optical lenses including m groups (where m is a natural number). The actuator 1130 may move the OPFE 1110 or an optical lens (hereinafter, referred to as an optical lens) to a specific position.

In an embodiment, the prism 1105 may change the path of light L incident in a first direction X to a second direction Y perpendicular to the first direction X. In addition, the prism 1105 may rotate the reflective surface 1107 of a light-reflecting material in a direction A about a central axis 1106 or rotate the central axis 1106 in a direction B and may change the path of light L incident in the first direction X to the second direction Y perpendicular thereto. Here, the OPFE 1110 may also move in a third direction Z perpendicular to both the first direction X and the second direction Y.

The image sensing device 1140 may include an image sensor 1142, a control logic 1144, and memory 1146. The image sensor 1142 may sense an image of an object to be sensed, by using the light L provided via the optical lens. In an embodiment, the image sensor 1142 may correspond to the image sensor 100 described with reference to FIG. 1 or FIG. 2 and may include at least one of the pixel arrays 110 described with reference to FIGS. 3A to 3C. The image sensing device 1140 may perform the image processing operations described with reference to FIGS. 5, 6, and 7A to 7C.

In an embodiment, each of the plurality of camera modules 1100*a* to 1100*c* in the camera module group 1100 may individually perform the image processing operations described with reference to FIGS. 5, 6, and 7A to 7C. Therefore, the plurality of camera modules 1100*a* to 1100*c* may have different characteristic information.

The control logic 1144 may control all operations of the camera module 1100*b*. For example, the control logic 1144 may control the operation of the camera module 1100*b* according to a control signal provided via a control signal line CSLb.

In an embodiment, one of the plurality of camera modules 1100*a*, 1100*b*, and 1100*c* may be a folded lens-type camera module (e.g., 1100*b*) including the prism 1105 and the OPFE 1110 described above, and the other camera modules (e.g., 1100*a* and 1100*b*) may each be vertical camera module that does not include the prism 1105 and the OPFE 1110. However, the embodiments are not limited thereto.

In an embodiment, one of the plurality of camera modules 1100*a*, 1100*b*, and 1100*c* may be a vertical depth camera (e.g., 1100*c*) that extracts depth information by using, for example, infrared rays (IR). In this case, the AP 1200 may merge image data values provided from the depth camera with image data values provided from another camera module (e.g., 1100*a* or 1100*b*) to generate a 3D depth image.

In an embodiment, at least two camera modules (e.g., 1100*a* and 1100*b*) among the plurality of camera modules 1100*a*, 1100*b*, and 1100*c* may have different fields of view. In this case, for example, at least two camera modules (e.g., 1100*a* and 1100*b*) among the plurality of camera modules 1100*a*, 1100*b*, and 1100*c* may have different optical lenses, but the embodiment is not limited thereto.

In addition, in an embodiment, the plurality of camera modules 1100*a*, 1100*b*, and 1100*c* may have different fields of view. In this case, the optical lenses in the plurality of camera modules 1100*a*, 1100*b*, and 1100*c* may also be different from each other, but the embodiment is not limited thereto.

In an embodiment, the plurality of camera modules 1100*a*, 1100*b*, and 1100*c* may be physically separated from each other. In other words, an independent image sensor 1142 may be provided inside each of the plurality of camera modules 1100*a*, 1100*b*, and 1100*c*, rather than the sensing region of one image sensor 1142 being divided and used by the plurality of camera modules 1100*a*, 1100*b*, and 1100*c*.

Referring back to FIG. 8, the AP 1200 may include an image processing device 1210, a memory controller 1220, and internal memory 1230. The AP 1200 may be provided separately from the plurality of camera modules 1100*a*, 1100*b*, and 1100*c*. For example, the AP 1200 and the plurality of camera modules 1100*a*, 1100*b*, and 1100*c* may be provided separately from each other as separate semiconductor chips.

The image processing device 1210 may include a plurality of sub-image processors 1212*a*, 1212*b*, and 1212*c*, an image generator 1214, and a camera module controller 1216.

The image processing device 1210 may include a plurality of sub-image processors 1212*a*, 1212*b*, and 1212*c* in a number corresponding to the number of camera modules 1100*a*, 1100*b*, and 1100*c*.

Image data values generated from the camera modules 1100*a*, 1100*b*, and 1100*c* may be provided to the corresponding sub-image processors 1212*a*, 1212*b*, and 1212*c* via separate image signal lines ISLa, ISLb, and ISLc, respectively. For example, the image data value generated from the camera module 1100*a* may be provided to the sub-image processor 1212*a* via the image signal line ISLa, the image data value generated from the camera module 1100*b* may be provided to the sub-image processor 1212*b* via the image signal line ISLb, and the image data value generated from the camera module 1100*c* may be provided to the sub-image processor 1212*c* via the image signal line ISLc. The transmission of these image data values may be performed using, for example, a camera serial interface (CSI) based on MIPI, but the embodiment is not limited thereto.

The image data value provided to each of the sub-image processors 1212*a*, 1212*b*, and 1212*c* may be provided to the image generator 1214. The image generator 1214 may generate an output image by using the image data provided from each of the sub-image processors 1212*a*, 1212*b*, and 1212*c* according to image generating information or a mode signal.

The camera module controller 1216 may provide a control signal to each of the camera modules 1100*a*, 1100*b*, and 1100*c*. The control signals generated from the camera module controller 1216 may be provided to the camera modules 1100*a*, 1100*b*, and 1100*c* via separate control signal lines CSLa, CSLb, and CSLc, respectively.

The AP 1200 may store the received image data values, that is, encoded data, in the internal memory 1230 inside the AP 1200 or in the external memory 1400 outside the AP 1200, and may then read and decode the encoded data from the internal memory 1230 or the external memory 1400 and display the image generated based on the decoded image data values. For example, among the plurality of sub-image processors 1212*a*, 1212*b*, and 1212*c* of the image processing device 1210, a corresponding sub-image processor may perform decoding and also perform image processing on the decoded image data value.

The PMIC 1300 may supply power, for example, power voltages, to the plurality of camera modules 1100*a*, 1100*b*, and 1100*c* via power signal lines PSLa, PSLb, and PSLc, respectively.

While the inventive concept has been particularly shown and described with reference to embodiments thereof, it will be understood that various changes in form and details may be made therein without departing from the spirit and scope of the following claims.

What is claimed is:

1. A method of operating an image signal processor, the method comprising:

storing region-specific color shading values extracted from first image data associated with an image;

obtaining information identifying a region of interest of the image;

receiving a global white balance gain;

calculating region-specific color shading weights based on a first color shading value of the region of interest and a second color shading value for each region of the image;

calculating region-specific white balance gains based on the global white balance gain and the region-specific color shading weights; and correcting white balance of second image data associated with the image based on the region-specific white balance gains.

2. The method of claim 1, wherein the obtaining of the region of interest and the receiving of the global white balance gain are performed on a first image frame of the second image data, and the calculating of the region-specific white balance gains and the correcting of the white balance are performed on a second image frame, which is a next frame of the first image frame.

3. The method of claim 1, wherein the receiving of the global white balance gain comprises receiving the global white balance gain from an application processor, and wherein the obtaining of the region of interest comprises receiving the region of interest from the application processor.

4. The method of claim 1, wherein the obtaining of the region of interest comprises:

calculating, from the second image data, region-specific sum of absolute difference (SAD) values for phase difference detection; and extracting, as the region of interest, a region with a minimum SAD value among the region-specific SAD values.

5. The method of claim 1, wherein the obtaining of the region of interest comprises:

calculating an average value of the region-specific color shading values; and extracting, as the region of interest, a virtual region with the average value.

6. The method of claim 1, wherein the calculating of the region-specific white balance gains comprises calculating, as the region-specific color shading weights, a ratio of the second color shading value to the first color shading value.

7. The method of claim 1, wherein the calculating of the region-specific white balance gains comprises calculating the region-specific white balance gains by multiplying the global white balance gain by the region-specific color shading weights.

8. The method of claim 1, wherein the region-specific color shading values represent amounts of light of a red wavelength, a green wavelength, and a blue wavelength for each region.

9. The method of claim 1, wherein the obtaining of the region of interest comprises obtaining coordinate values of at least one pixel in the region of interest.

10. An image signal processor comprising:

a color shading profile storage circuit configured to store region-specific color shading values extracted from first image data associated with an image;

a region of interest-obtaining circuit configured to obtain information identifying a region of interest of the image;

a global white balance gain-receiving circuit configured to receive a global white balance gain from an application processor;

a region-specific white balance gain-calculating circuit configured to calculate region-specific color shading weights based on a first color shading value of the region of interest and a second color shading value for each region of the image, and configured to calculate region-specific white balance gains based on the global white balance gain and the region-specific color shading weights; and a white balance-correcting circuit configured to correct white balance of second image data associated with an image based on the region-specific white balance gains.

11. The image signal processor of claim 10, wherein the region of interest-obtaining circuit and the global white balance gain-receiving circuit obtain the region of interest and receive the global white balance gain, respectively, for a first image frame of the second image data, and the region-specific white balance gain-calculating circuit and the white balance-correcting circuit calculate the region-specific white balance gains and correct the white balance, respectively, for a second image frame, which is a next frame of the first image frame.

12. The image signal processor of claim 10, wherein the region of interest-obtaining circuit is configured to receive the region of interest from the application processor, extract, from the second image data, as the region of interest, a region with a minimum sum of absolute difference (SAD) value among region-specific SAD values calculated for phase difference detection, or extract, as the region of interest, a virtual region with an average value of the region-specific color shading values.

13. The image signal processor of claim 10, wherein the region-specific white balance gain-calculating circuit is configured to calculate, as the region-specific color shading weights, a ratio of the second color shading value to the first color shading value and calculate the specific white balance gains by multiplying the global white balance gain by the region-specific color shading weights.

14. The image signal processor of claim 10, wherein the region-specific color shading values represent amounts of light of a red wavelength, a green wavelength, and a blue wavelength for each region.

15. An image sensor comprising:

a memory configured to store region-specific color shading values extracted from first image data generated at a first point in time; and an image signal processor configured to obtain a region of interest for second image data generated at a second point in time after the first point in time, receive a global white balance gain from an application processor, extract a first color shading value of the region of interest from the region-specific color shading values stored in the memory, calculate region-specific color shading weights, based on the first color shading value and the region-specific color shading values, calculate region-specific white balance gains, based on the global white balance gain and the region-specific color shading weights, and correct white balance of the second image data, based on the region-specific white balance gains.

16. The image sensor of claim 15, wherein the image signal processor is configured to:

obtain the region of interest and receive the global white balance gain, for a first image frame of the second image data; and extract the first color shading value, calculate the region-specific color shading weights, calculate the region-specific white balance gains, and correct the white balance, for a second image frame, which is a next frame of the first image frame of the second image data.

17. The image sensor of claim 15, wherein the image signal processor is configured to receive the region of interest from the application processor, extract, from the second image data, as the region of interest, a region with a minimum sum of absolute difference (SAD) value among region-specific SAD values calculated for phase difference detection, or extract, as the region of interest, a virtual region with an average value of the region-specific color shading values.

18. The image sensor of claim 15, wherein the image signal processor is configured to calculate, as the region-specific color shading weights, a ratio of the second color shading value to the first color shading value and calculate the region-specific white balance gains by multiplying the global white balance gain by the region-specific color shading weights.

19. The image sensor of claim 15, wherein the region of interest represents coordinate values of one pixel.

20. The image sensor of claim 19, wherein, when the region of interest comprises a plurality of pixels, the region of interest represents coordinate values of one pixel located at a center among the plurality of pixels.

* * * * *